UNITED STATES PATENT OFFICE.

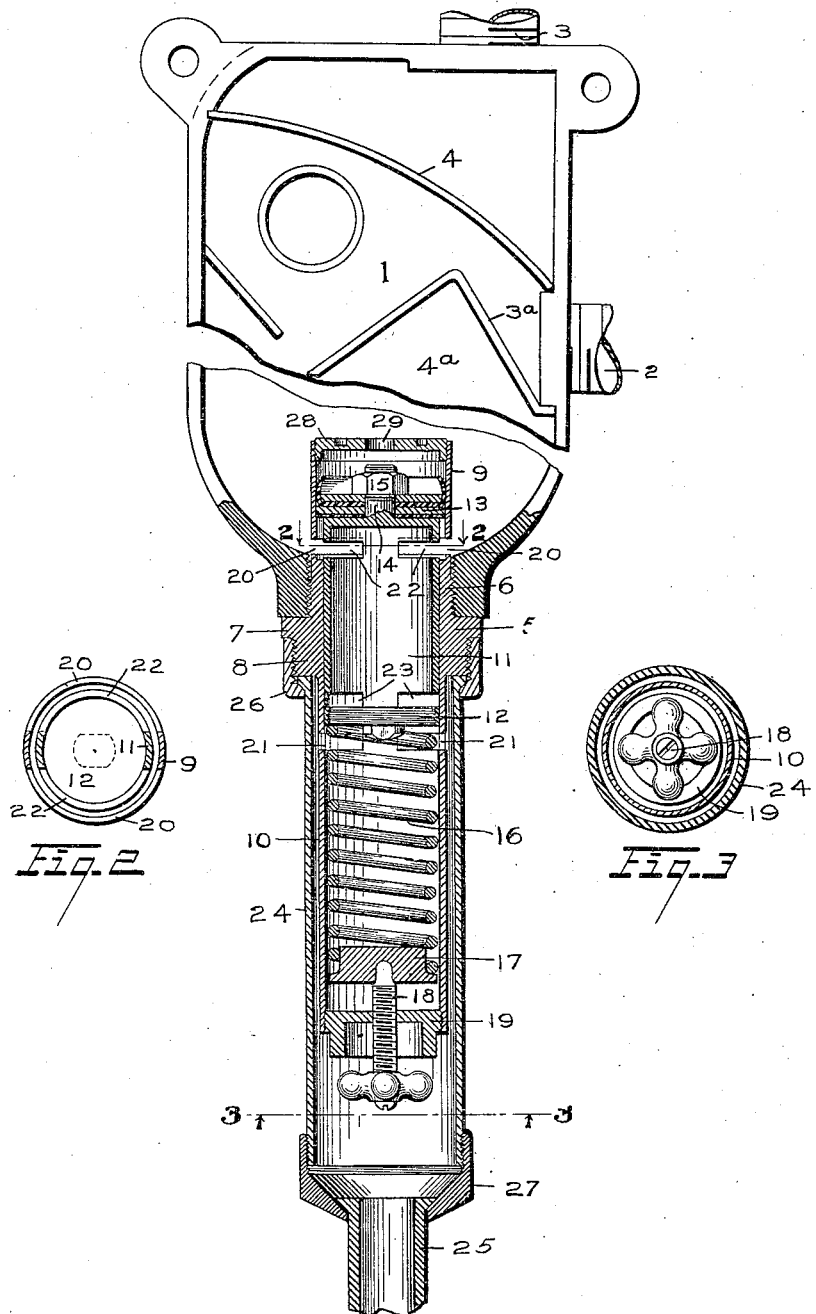

OTTO F. KADOW AND JOSEPH H. LYONS, OF CLEVELAND, OHIO, ASSIGNORS, BY DIRECT AND MESNE ASSIGNMENTS, OF ONE-THIRD TO SAID KADOW AND TWO-THIRDS TO CHARLES P. SALEN, OF CLEVELAND, OHIO.

AUTOMATIC FLUSHING DEVICE.

No. 873,554.      Specification of Letters Patent.      Patented Dec. 10, 1907.

Application filed January 28, 1907. Serial No. 354,387.

*To all whom it may concern:*

Be it known that we, OTTO F. KADOW and JOSEPH H. LYONS, residing at Cleveland, in the county of Cuyahoga and State of Ohio, have invented a certain new and useful Improvement in Automatic Flushing Devices, of which the following is a full, clear, and exact description, reference being had to the accompanying drawings.

Our invention relates to flushing devices for fluid receptacles, meters, filters, or conduits, and it has for its object the production of a device of this character that is automatic in its operation, being controlled by the fluid pressure, and one that is, moreover, simple in construction, economical in manufacture, convenient in application, and certain in its action.

While our invention is more or less general in its application to both liquids and gases, we have, for purposes of illustration, shown the same as applied to a water trap of the type that is shown in the application of Otto F. Kadow, No. 321,596, filed June 14, 1906.

In the drawings forming a part of our application, Figure 1 is a longitudinal sectional view through our flushing device and through the water trap to which it is shown as attached, parts of the trap being broken away; Fig. 2 is a transverse sectional view through the flushing device taken on the line 2—2 of Fig. 1; and Fig. 3 is a transverse sectional view through the flushing device taken on the line 3—3 of Fig. 1.

As is well understood, when water or other fluid is permitted to stand in a receptacle, or even to flow slowly through a conduit, the sediment within the fluid is deposited in the lower part of said receptacle or conduit. In water systems for cities, especially where there is a considerable amount of sediment in the water, it is a common practice to connect traps with the water pipes and to cause the liquid to circulate in said traps in such a manner as will permit the sediment in the water to deposit itself in the traps, from which it may be removed. The usual practice is to provide such a trap with a vent plug, which may be removed in order that the sediment may be flushed out of the trap. This operation is tedious to perform and is liable to be neglected, in which case the trap will accumulate so much sediment as to become practically useless. It is the object of our invention to make the flushing device for the trap, or other structure to which our invention may be applied, entirely automatic in its operation, the same being controlled by the fluid pressure within said structure.

Taking up a detailed description by reference to the accompanying drawing, 1 represents a water trap to which our invention is shown as applied. This trap has a water inlet 2 and a water outlet 3. Within the trap opposite the inlet is arranged a deflecting plate 3ª, and above said deflecting plate, and separating the inlet and outlet orifices, is a screen 4. Below the deflecting plate is a chamber 4ª in which the sediment collects. Inasmuch as the specific construction of the device to which our flushing mechanism is applied does not constitute a part of our present invention, it is not deemed necessary to describe the trap further, but reference may be made to the application above referred to for further particulars, if desired.

At the lower end of the trap, there is provided a screw-threaded extension into which we screw the flushing device, so that the upper end of said device projects into the chamber 4ª. This flushing device consists of a main member 5, said member being provided with a threaded portion 6 for screwing into the trap. Below the said threaded portion this member has a nut portion 7 for the reception of a wrench whereby the flushing device may be screwed into the trap, and below said nut portion the member is also provided with a screw-threaded extension 8, for a purpose hereinafter set forth. Above the threaded portion 6 the member 5 is provided with a tubular portion 9, and a similar tubular portion 10 is provided on said member below the extension 8. The member 5 is therefore a long hollow cylinder with means thereon for attaching the same to the trap or other structure to which our invention is applied. Mounted to reciprocate within the member 5 is a hollow cylindrical valve 11, said valve being closed at both its upper and lower ends, the lower closure 12 being screwed within the valve. Mounted upon the upper end of the valve, and fitting the tubular portion 9, is a piston 13, said piston being held to the valve by a bolt extension 14 that extends through the piston and receives on its outer end a nut 15. Below the valve 11 and bearing against the closure 12 thereof is a helical spring 16, the lower end of said spring resting upon a follower 17 that is supported by an adjusting screw 18, said screw passing through a nut 19 that screws into the lower end of the sleeve 10 of the member 5. The tendency of the spring 16 is to hold the valve 11 in its upper position, as shown in Fig. 1; and, by turning the screw 18, the tension of said spring may be adjusted so as to adapt the device to the fluid pressure used. Within the member 5 above the screw-threaded portion 6 thereof we form, at diametrically opposite points, slots 20, said slots being preferably flush with the lower portion of the trap or other device to which our invention is applied. Below the trap the tubular portion 10 of the member 5 is also provided with diametrically arranged slots 21. While we have shown and thus described the slots 20 and 21 as being made in pairs diametrically arranged, it will be understood that a different number of said slots may be employed and that they may be arranged in any desired manner. Within the valve 11 we also provide at diametrically opposite points pairs of slots 22 and 23, the pairs of slots in the valve being closer together than the pairs of slots 20 and 21 in the member 5. The number and arrangement of the slots in the valve will, of course, correspond with the number and arrangement of the slots in the member 5. When the valve is in its upper position, as shown in Fig. 1, the slots 22 register with the slots 20, so that any sediment that may have accumulated in the trap will be flushed into the valve by the water as it enters the latter. When the valve is depressed until the slots 23 register with the slots 21, the water contained in the valve and the sediment therein will be flushed through the slots 23 and 21 into a tube 24 that surrounds the tubular portion 10 of the member 5 and depends below the same, where it is secured to a pipe 25 that leads to a sewer pipe or receptacle, not shown. The sleeve 24 is secured to the member 5 by means of a union 26 that engages with the sleeve and that screws onto the threaded extension 8 of said member. The pipe 25 is likewise secured to the sleeve 24 by a union 27 that engages with said pipe and that screws onto said sleeve.

The upper end of the cylinder above the piston is open to the pressure of the water within the trap. When the water is free to flow out of the trap through the outlet 3, the pressure of the water within the trap falls until it is overcome by the pressure of the spring 16, with the result that said spring forces the valve 11 upwardly into the position shown in Fig. 1, at which time the sediment in the trap may be flushed into the valve, which becomes filled, as the slots 21 and 23 are then out of alinement. As long as the water is flowing through the trap so freely as to maintain the diminished pressure, the valve will remain in the position just described. When, however, the outlet pipe 3 is closed, the pressure in the trap rises to normal, which normal pressure is sufficient to depress the valve against the pressure of the spring 16, which brings the slots 23 into register with the slots 21 and thereby permits the water and sediment in the valve to escape into the sewer pipe, while, at the same time the slots 20 and 22 are thrown out of register, so that no fluid can enter the valve until the latter is again lifted.

It will thus be seen that our flushing valve is automatic in its operation, being controlled by the pressure of the fluid within the trap or other structure to which it may be attached.

In order to better control the movement of the valve, we prefer to restrict the entrance of the fluid into the cylinder above the piston; and for that reason we may close the upper end of the cylinder with a head 28, which screws into the cylinder, at the center of which head we provide an opening 29 through which the fluid may flow. By increasing or diminishing the size of this opening we likewise increase or diminish the facility with which the fluid may enter and be discharged from the cylinder and thereby control the speed of operation of the valve.

As the openings or ports 20 and 21 are wider apart than are the openings or ports 22 and 23 in the valve, the openings 21 are fully closed before the ports 20 are opened, so that there can be no material waste of the fluid. In each operation of the device only a small and what may be termed a measured quantity of fluid, depending upon the capacity of the interior of the valve, is permitted to escape.

While we have thus shown and described a specific mechanism for accomplishing the results set forth, we desire it to be understood that we claim broadly any form of device that operates on these principles, and that the following claims are not to be limited to the specific structure thus shown and described any further than is made necessary by the specific terms employed therein or by the prior state of the art.

We claim:

1. In a flushing device that is adapted to be applied to a receptacle or conduit for fluids wherein sediment may accumulate, a valve for permitting said sediment to escape, and means whereby said valve is opened and closed as the pressure of the fluid in the receptacle or conduit is varied.

2. In a flushing device that is adapted to be applied to a receptacle or conduit wherein sediment may accumulate, a valve that is subjected to the pressure of the fluid within said receptacle or conduit, means tending to lift said valve against said pressure, and a passage through which the sediment may escape from the receptacle or conduit when the pressure of the liquid therein falls below normal and the valve is moved against said pressure.

3. In a flushing device that is adapted to be applied to a receptacle or conduit wherein sediment may accumulate, a valve that is subjected to the pressure of the fluid within said receptacle or conduit, a spring tending to lift said valve against said pressure, means for varying the tension of said spring, and a passage through which the sediment may escape from the receptacle or conduit when the pressure of the liquid therein falls below normal and the valve is moved by the spring against said pressure.

4. In a flushing device that is adapted to be applied to a receptacle or conduit for fluids wherein sediment may accumulate, a tubular member, means for securing said tubular member to said receptacle or conduit, the end of said tubular member being open to the fluid in the receptacle or conduit, a valve in said tubular member, means for forcing said valve against the pressure of the fluid in the receptacle or conduit, and a passage through which the sediment may escape from the receptacle or conduit when the pressure therein falls below the normal and the valve is moved against said pressure.

5. In a flushing device that is adapted to be applied to a receptacle or conduit for fluids wherein sediment may accumulate, a tubular member, means for securing said tubular member to said receptacle or conduit, the end of said tubular member being open to the fluid in the receptacle or conduit, a valve in said tubular member, a spring for forcing said valve against the pressure of the fluid in the receptacle or conduit, means for varying the tension of said spring, and a passage through which the sediment may escape from the receptacle or conduit when the pressure therein falls below the normal and the valve is moved by the spring against said pressure.

6. In a flushing device that is adapted to be applied to a receptacle or conduit for fluids wherein sediment may accumulate, a tubular member, means on said member for attaching the same to the receptacle or conduit, a cylindrical valve mounted to reciprocate in said tubular member, a piston on said valve, said piston being subjected to the pressure of the fluid within the receptacle or conduit, means for moving said valve and piston against said pressure, and a passage through said tubular member through which the sediment may be flushed when the pressure in the receptacle or conduit falls below normal and the valve is moved against said pressure.

7. In a flushing device that is adapted to be applied to a receptacle or conduit for fluids wherein sediment may accumulate, a tubular member, means on said member for attaching the same to the receptacle or conduit, a cylindrical valve mounted to reciprocate in said tubular member, a piston on the inner end of said valve, said piston being subjected to the pressure of the fluid within the receptacle or conduit, a spring for moving said valve and piston against said pressure, and a passage through said tubular member and valve through which the sediment may be flushed when the pressure in the receptacle or conduit falls below normal and the valve is moved against said pressure.

8. In a flushing device that is adapted to be applied to a receptacle or conduit for fluids wherein sediment may accumulate, a tubular member, means for attaching said member to the receptacle or conduit, an opening in said member at the point where the sediment accumulates, a valve within said tubular member, an opening or port in said valve, said valve being normally held by the pressure of the fluid within the receptacle or conduit in such position that the port therein is out of register with the opening in the tubular member, and means for forcing said valve against said pressure whereby, when the pressure is reduced by permitting the fluid to flow freely through the receptacle or conduit, the valve will be moved so as to bring said port into register with the said opening and thereby permit the sediment to be flushed from the receptacle or conduit.

9. In a flushing device that is adapted to be applied to a receptacle or conduit for fluids wherein sediment may accumulate, a tubular member, means for attaching said member to the receptacle or conduit, openings in said member at points above and below said attaching means, a hollow, cylindrical valve within said tubular member, said valve being closed at its ends, openings or ports in said valve near each end thereof, said valve being normally held by the pressure of the fluid within the receptacle or conduit in such position that the port near the upper end thereof is out of register with the opening in the tubular member while the port near the lower end is in register with the opening in said member, and means for forcing said valve against the said pressure whereby, when the pressure is reduced by permitting the fluid to flow freely through the receptacle or conduit, the valve will be moved so as to bring the upper port therein into register with the opening in the tubular member and thereby permit the sediment to be flushed from the receptacle or conduit.

10. In a flushing device that is adapted to be applied to a receptacle or conduit for fluids wherein sediment may accumulate, a tubular member, means for securing said member to the receptacle or conduit, the inner end of said member being open and projecting into said receptacle or conduit, a valve mounted to reciprocate in said tubular member, a piston on the inner end of said valve, ports or openings in the tubular member and in said valve, said ports being normally held out of register with each other by the fluid pressure so that fluid cannot pass therethrough, and means for moving said valve so as to bring said ports into register when the fluid pressure in the receptacle or conduit falls below normal.

11. In a flushing device that is adapted to be applied to a receptacle or conduit for fluids wherein sediment may accumulate, a tubular member, means for securing said member to the receptacle or conduit, the inner end of said member being open and projecting into said receptacle or conduit, a valve mounted to reciprocate in said tubular member, a piston on the inner end of said valve, ports or openings in the tubular member and in said valve, said ports being normally held out of register with each other by the fluid pressure so that fluid cannot pass therethrough, means for moving said valve so as to bring said ports into register when the fluid pressure in the receptacle or conduit falls below normal, whereby the sediment may be flushed from he receptacle or conduit, and a tube surrounding the outer end of the tubular member for receiving the sediment and for conducting it away from the flushing device.

12. In a flushing device that is adapted to be applied to a receptacle or conduit for fluids wherein sediment may accumulate, a hollow walve that is closed at each of its ends and that is moved in one direction by the fluid within the receptacle or conduit, means for moving the valve in the opposite direction, a port near the inner end of said valve through which the fluid may pass into the valve when the latter is in its inner position, and a port near the outer end of the valve through which the fluid may escape from the valve when the latter is in its outer position.

13. In a flushing device that is adapted to be applied to a receptacle or conduit for fluids wherein sediment may accumulate, a hollow valve that is closed at each of its ends, a piston on one end of said valve whereby the latter is moved in one direction by the fluid within the receptacle or conduit, a spring for moving the valve in the opposite direction, means for adjusting the tension of said spring, a port near the inner end of said valve through which the fluid may pass into the valve when the latter is in its inner position, and a port near the outer end of the valve through which the fluid may escape from the valve when the latter is in its outer position.

14. In a flushing device that is adapted to be applied to a receptacle or conduit wherein sediment may accumulate, a hollow cylindrical valve that is closed at each of its ends, said valve being moved in one direction by the fluid pressure within the receptacle or conduit, and means for moving the valve in the opposite direction, the construction being such that each time the fluid is permitted to flow through the receptacle or conduit and said flow is then checked, a measured quantity of the fluid will be permitted to escape through the said valve, and the said receptacle or conduit will be thus flushed.

15. In a flushing device that is adapted to be applied to a receptacle or conduit wherein sediment may accumulate, a hollow cylindrical valve that is closed at each of its ends, a piston on one end of said valve whereby the latter is moved in one direction by the fluid pressure within the receptacle or conduit, a spring for moving the valve in the opposite direction, the construction being such that each time the fluid is permitted to flow through the receptacle or conduit and said flow is then checked, a measured quantity of the fluid will be permitted to escape through the said valve, and the said receptacle or conduit will be thus flushed, and a pipe connected with the flushing device for receiving the fluid from the valve.

16. In a flushing device that is adapted to be applied to a receptacle or conduit for fluids wherein sediment may accumulate, a tubular member, means for securing said member to the receptacle or conduit, said member being open and projecting into the said receptacle or conduit, a hollow cylindrical valve mounted to reciprocate in said tubular member, openings or ports in the tubular member on opposite sides of the point of attachment to the receptacle or conduit, a port within the valve near each end of the latter, the port near the inner end of the valve being adapted to register with the inner opening in the tubular member when the valve is in its inner position, and the port in the other end of the valve being adapted to register with the other port in the tubular member when the valve is in its outer position, a piston on the inner end of the valve, said piston being subjected to the pressure of the fluid within the receptacle or conduit for moving the valve in one direction, and means for moving the valve in the opposite direction, the construction and arrangement being such that when the fluid is permitted to flow through the receptacle or conduit, the valve will be forced inwardly to receive fluid and sediment and when the said flow is checked the pressure of the fluid will force the valve outwardly so that the fluid and sediment within the valve are discharged therefrom.

17. In a flushing device that is adapted to be applied to a receptacle or conduit for fluids wherein sediment may accumulate, a tubular member, means for securing said member to the receptacle or conduit, said member being open and projecting into the said receptacle or conduit, a hollow cylindrical valve mounted to reciprocate in said tubular member, openings or ports in the tubular member on opposite sides of the point of attachment to the receptacle or conduit, a port within the valve near each end of the latter, the port near the inner end of the valve being adapted to register with the opening in the tubular member when the valve is in its inner position, and the port in the other end of the valve being adapted to register with the other port in the tubular member when the valve is in its outer position, a piston on the inner end of the valve, said piston being subjected to the pressure of the fluid within the receptacle or conduit for moving the valve in one direction, an adjustable spring for moving the valve in the opposite direction, the construction and arrangement being such that when the fluid is permitted to flow through the receptacle or conduit, the spring will force the valve inwardly to receive fluid and sediment and when the said flow is checked the pressure of the fluid will force the valve outwardly so that the fluid and sediment within the valve are discharged therefrom, and means for conducting the fluid and sediment away from the valve.

18. In a flushing device that is adapted to be applied to a receptacle or conduit for fluid wherein sediment may accumulate, a tubular member, a valve mounted within said tubular member for permitting the said sediment to escape, means whereby said valve is controlled by the pressure of the fluid in the receptacle or conduit, a tube surrounding the outer end of said tubular member for receiving the said sediment and for conducting it away from the flushing device, and means for securing said tube to the tubular member.

19. In a flushing device that is adapted to be applied to a receptacle or conduit for fluid wherein sediment may accumulate, a tubular member, a valve mounted within said tubular member for permitting the said sediment to escape, said valve being moved in one direction by the pressure of the fluid in the receptacle or conduit, a spring for moving the valve in the opposite direction, a tube surrounding the outer end of said tubular member for receiving the said sediment and for conducting it away from the flushing device, and means for securing said tube to the tubular member.

20. In a flushing device that is adapted to be applied to a receptacle or conduit for fluids wherein sediment may accumulate, a tubular member projecting into the said receptacle or conduit, a valve within said tubular member, means whereby said valve at each complete operation will receive and discharge a measured quantity of the fluid from the receptacle or conduit, and means for restricting the opening into the inner end of the tubular member, whereby the operation of the valve may be more effectually controlled.

21. In a flushing device that is adapted to be applied to a receptacle or conduit for fluids wherein sediment may accumulate, a tubular member projecting into the said receptacle or conduit, a hollow cylindrical valve within said tubular member, means whereby said valve at each complete operation will receive and discharge a measured quantity of the fluid from the receptacle or conduit, means for restricting the opening into the inner end of the tubular member, whereby the operation of the valve may be more effectually controlled, and a tube connected with said tubular member for conveying the fluid and the sediment from the valve.

In testimony whereof, we hereunto affix our signatures in the presence of two witnesses.

OTTO F. KADOW.
JOSEPH H. LYONS.

Witnesses:
 ALBERT H. BATES,
 S. E. FOUTS.